United States Patent
Tyagi et al.

(10) Patent No.: US 6,294,595 B1
(45) Date of Patent: Sep. 25, 2001

(54) POLYMERIC POWDERS AND METHOD OF PREPARATION

(75) Inventors: Dinesh Tyagi, Fairport; Donna A. DiPrima, Rochester, both of NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/385,567

(22) Filed: Aug. 30, 1999

(51) Int. Cl.$^7$ ........................................................ C08K 3/00
(52) U.S. Cl. ............................................. 523/333; 523/334
(58) Field of Search ..................................... 523/333, 334

(56) References Cited

U.S. PATENT DOCUMENTS

| | | |
|---|---|---|
| 4,833,060 | 5/1989 | Nair et al. . |
| 4,965,131 | 10/1990 | Nair et al. . |
| 5,049,469 | 9/1991 | Pierce et al. . |
| 5,283,151 | 2/1994 | Santilli . |
| 5,370,963 | 12/1994 | Patel et al. . |
| 5,370,964 | 12/1994 | Patel et al. . |
| 5,501,935 | 3/1996 | Patel et al. . |

OTHER PUBLICATIONS

A. W. Adamson, "Physical Chemistry of Surfaces", pp. 584–588 and 602–605, Second Edition, Intersciences.
Dupont Company, "Ludox colloidal silica—Properties, Uses, Storage and Handling", product information brochure of the Dupont Company.

Primary Examiner—Edward J. Cain

(57) ABSTRACT

Polymeric powders of small particle size and size distribution and of irregular morphology are prepared by a limited coalescence procedure wherein a polymer in an organic solvent is dispersed by high shear agitation in an aqueous phase containing colloidal stabilizer particles having opposite electrostatic charges. The organic solvent is evaporated and the polymer particles are recovered from the aqueous medium. The particles are of irregular shape and narrow particle size distribution and have superior electrostatic transfer properties when used as electrostatographic dry toners.

9 Claims, No Drawings

POLYMERIC POWDERS AND METHOD OF PREPARATION

FIELD OF THE INVENTION

This invention relates to the preparation of polymeric powders especially useful as electrostatographic toners and, more particularly, to an evaporative limited coalescence method for the preparation of non-spherical toner particles and to the resulting novel toner and developer compositions.

BACKGROUND OF THE INVENTION

In the conventional method of making electrostatographic toner powders, a binder polymer and other ingredients, such as a pigment and a charge control agent, are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrostatographic developer compositions; their low melt elasticity increases the off-set of toner to the hot fuser rollers of the electrostatographic copying apparatus, and the glass transition temperature (Tg) of the binder polymer is difficult to control. In addition, grinding of the polymer results in a wide particle size distribution. Consequently, the yield of useful toner is lower and manufacturing cost is, therefore, higher. Also the toner fines accumulate in the developer station of the copying apparatus and adversely affect the developer life.

The preparation of toner polymer powders from a preformed polymer by the process known as "evaporative limited coalescence" offers many advantages over the conventional grinding method of producing toner particles. In this process, polymer particles of small size and narrow size distribution are obtained by forming a solution of a polymer in a solvent that is immiscible with water, dispersing the solution so formed in an aqueous medium containing a solid colloidal stabilizer such as colloidal silica, and removing the solvent by evaporation. The resultant polymer particles are then isolated, washed and dried.

Toner particles can be prepared by the evaporative limited coalescence technique from any type of binder polymer that is soluble in a solvent that is immiscible with water. The size and size distribution of the resulting polymer particles can be controlled by the relative quantities of the polymer employed, the solvent, the quantity and size of the water-insoluble particulate suspension stabilizer and the size to which the solvent-polymer droplets are reduced by the agitation employed in dispersing the organic solution in the aqueous medium.

Limited coalescence technology provides a means for overcoming many of the drawbacks of the prior art melt blending and grinding procedures for toner manufacture. By using the limited coalescence method it is possible to obtain narrow particle size distribution with no fines, to use tough binder polymers which would be difficult to pulverize and to use toner ingredients which would be degraded in a melt blending process. Representative patents disclosing toner manufacture by limited coalescence and advantages thereof include U.S. Pat. Nos. 4,833,060; 4,835,084; 4,965,131; and 5,133,992, each of which is incorporated herein by reference.

A characteristic of the toner particles prepared by the prior art method of limited coalescence is that the particles are generally spherical, especially when the particle size is smaller than 10 microns. Spherical particles can provide some advantages in the quality of the image formed. However, the transfer efficiency, i.e., in transferring a developed toner image from the photoconductor to a receiving sheet by electrostatic attraction, is superior for particles of irregular shape. It is believed that irregular particles help in electrostatic transfer of toner by interlocking with neighboring particles having irregular morphology. Accordingly, workers in the art have sought to modify the shape of the normally spherical toners made by evaporative limited coalescence in order to improve the transfer properties of the toner. U.S. Pat. No. 5,283,151 describes one method by which irregularly shaped particles can be obtained by limited coalescence. In the method of the patent, carnauba wax is introduced into the organic phase of the limited coalescence process in a limited amount. The use of the limited amount of this specific wax, i.e., carnauba wax, which is highly surface active, results in the formation of non-spherical toner particles once the solvent is removed.

Although it is possible to produce irregular polymeric particles by the use of carnauba wax as a toner component, the wax cannot be removed from the polymer particles by the method used for removing silica from the polymer particles in conventional limited coalescence methods. i.e., by washing the particles with an aqueous alkaline solution. The retention of the wax on the polymer particles has several disadvantages in the use of the polymeric powder as an electrostatographic toner. For example, it can adversely affect the tribocharging properties, particle cohesiveness, powder flow behavior, sensitivity to environment, scumming of carrier particles or photoconductor, Theological performance, and/or toner keeping behavior.

There is a need, therefore, for a process for making non-spherical, irregular toner particles that offers the benefits of the limited coalescence method but without the undesirable effects of additives such as carnauba wax in the toner formulation.

The present invention provides such a process as well as novel polymeric powders that are useful as electrostatographic toners.

SUMMARY OF THE INVENTION

In the method of the invention polymeric powders of small particle size and non-spherical shape are prepared by forming an organic phase comprising an organic polymer dissolved in a water-immiscible organic solvent, forming an aqueous phase comprising water, a colloidal particulate stabilizer having a positive electrostatic charge and a colloidal particulate stabilizer having a negative electrostatic charge, mixing said aqueous phase and said organic phase and homogenizing the resulting mixture by high shear agitation, thereby forming a suspension of small polymer particles in the water, said particles having both positively charged and negatively charged particulate stabilizer on their surfaces, separating the water-immiscible solvent from the polymer and, recovering from the water phase a polymeric powder comprising particles of non-spherical, irregular shape.

In the method of the invention the organic and aqueous phases are mixed under conditions such that both the positively charged and the negatively charged particulate stabilizers deposit on the surfaces of the polymer particles. Particles of irregular shapes, which improves the transfer efficiency when the polymer particles are used as electrostatographic toners, are thereby achieved.

The electrostatographic toner composition of the invention comprises monodisperse polymeric particles that consist predominantly of a binder polymer that forms a continuous and homogeneous matrix throughout the particle, the particles being of non-spherical irregular shape, the composition having a fineness index, $d_{50}/d_{16}$, between about 1.0 and 1.35 and a coarseness index. $D_{84}/D_{50}$, between 1.0 and 1.35, and the particles having a BET to Coulter surface area ratio from about 1.5 to 3.0.

The invention further includes a developer composition comprising a mixture of carrier particles and toner particles of the invention.

DETAILED DESCRIPTION OF THE INVENTION

In accordance with the invention, the binder polymer from which the polymeric powders are to be made is dissolved in an organic solvent that is immiscible with water. The invention is applicable to the preparation of polymeric particles of small particle size and irregular morphology from any normally solid polymer that can be dissolved in a solvent that is immiscible with water, including, for example, olefin homopolymers and copolymers, such as, polyethylene, polypropylene, polyisobutylene and polyisopentylene; polyfluoroolefines, such as polytetrafluoroethylene and polytrifluorochloroethylene, polyamides, such as polyhexamethylene adipamide, polyhexamethylene sebacamide, and polycaprolactam; acrylic resins, such as polymethyl methacrylate, polymethyl acrylate, polyethyl methacrylate and styrene-methylmethacrylate; ethylene-methyl acrylate copolymers, ethylene-ethyl acrylate copolymers, ethylene-ethyl methacrylate copolymers, polystyrene and copolymers of styrene with unsaturated monomers, cellulose derivatives, polyesters, polyvinyl resins and ethylene-allyl alcohol copolymers and the like. Especially useful as toner polymers are thermoplastic polyesters and acrylic copolymers.

Any solvent that will dissolve the polymer and that is also immiscible with water can be used in the method of the invention such as, for example, chloromethane, dichloromethane, ethyl acetate, vinyl chloride, methylethyl ketone, trichloromethane, carbon tetrachloride, ethylene chloride, trichloroethane, toluene, xylene, cyclohexanone, 2-nitropropane and the like. Particularly useful solvents are ethylacetate and dichloromethane. Both are good solvents for many useful polymers and are immiscible with water. Further, their volatility is such that they can readily be removed from the discontinuous phase droplets by evaporation.

The relative quantity of solvent influences the size of the powder particles that result. Generally, higher concentrations of polymer in the solvent produce particles having a lower degree of shrinkage, and, hence, less irregularity of shape than smaller particles produced by lower concentrations of polymer in the same solvent. The concentration of the polymer in the solvent should be from about 1 to 80 and preferably from about 2 to about 60% by weight. For example, when preparing electrostatographic toner particles having a polyester binder the concentration of polymer in the solvent is generally maintained at from 10 to 40% by weight for a polymer resin having a number average molecular weight of 10,000 and a weight average molecular weight of 200,000.

The solution of polymer in the solvent is next introduced into an aqueous medium containing a colloidal dispersion of at least two particulate stabilizers which have opposite electrostatic charges. In the method of the invention, both the negatively charged and the positively charged colloidal stabilizer coagulate or deposit on the polymer particles. In other words, they co-coagulate from the colloidal suspensions. If only one of the stabilizers deposits, the polymer particles will be of spherical shape, as in limited coalescence processes of the prior art, instead of the desired irregular shape. In general, it can be said that in the method of the invention when the aqueous and organic phases are mixed, the solution conditions are adjusted to ensure coagulation of both types of stabilizer. One way to achieve this is to adjust the pH of the mixture by addition of an aqueous acid or alkaline solution to a level at which both stabilizers will coagulate and deposit on the polymer particles. For example, some positive colloidal stabilizers are stable in an acid solution. e.g., pH of 4, but will coagulate when the pH is raised to at least 6. Certain negative colloidal stabilizers are stable in alkaline solution, e.g., pH of 8, but will coagulate when the pH is reduced to 6 or below.

Another way to promote coagulation of both types of stabilizers is to add a surface active agent to the solution. A wide range of ionic or nonionic surfactants can be used including various sodium alkyl benzene sulfonates and linear alkyl sulfonates.

In the method of the invention useful colloidal stabilizers include aqueous colloidal silica dispersions such as the Ludox® colloidal silicas available from the DuPont Company and Nalcoag® colloidal silicas sold by Nalco. Examples include Ludox® CL silica, the particles of which are coated with alumina and are positively charged and Ludox® TM which is sodium stabilized and negatively charged. Properties of the colloidal silica products are described in the published product information brochure of the DuPont Company entitled "Ludox® colloidal silica—Properties, Uses, Storage and Handling". Also useful in the method of the invention are oppositely charged latex stabilizers of the types disclosed in U.S. Pat. Nos. 4,965,131 and 5,133,992, incorporated herein by reference.

The term latex is used herein as meaning an emulsion of polymeric plastic particles or globules in water, in accordance with the definition in Hawley's "Condensed Chemical Dictionary", $13^{th}$ Edit., Van Nostrand Reinhold, Publishers. Examples of colloidal copolymers that are useful colloidal latex stabilizers in the polymer suspension limited coalescence process for producing toner particles are described in the patent to Nair et al., U.S. Pat. No. 4,965,131, incorporated herein by reference. The process of the '131 patent offers the advantage of employing a stabilizer that does not require a promoter or removal of the stabilizer from the toner particle surfaces, as is required with silica stabilizers. However, the '131 patent does not suggest the use of a combination of oppositely charged stabilizers to obtain polymer particles of irregular shape and narrow particle size distribution.

The use of a latex or polymer emulsion in preparing another kind of toner composition is disclosed in the patent to Patel et al., U.S. Pat. No. 5,501,935. The patent describes a process in which the latex particles aggregate to form the toner particles, unlike the process of the present invention wherein polymerized latex stabilizer particles merely form a thin skin on a preformed core polymer particle. The toner particles of the '935 patent do not have an essentially homogeneous and uniform core as do particles formed by the polymer suspension, limited coalescence process of the present invention. In each individual polymeric particle of the toner powder of the invention, the binder polymer forms a continuous and homogeneous matrix within which can be distributed toner addenda such as colorant and charge control agent. Latex particles, if used as the stabilizer, form a thin skin of thickness no greater than about 125 nm and comprise no more than about 10 percent of the total weight of the polymeric toner particle. In contrast, the individual powder particles made by a process such as that of the '935 patent are agglomerates or aggregates of smaller colloidal particles. The individual particles of the '935 patent process, therefore, do not have the uniform, homogeneous polymer core or matrix that characterizes the product of the present invention. As a consequence of this difference in structure, the toner particles of weoghtthe present invention, as compared with the aggregate type of toner particle, are less subject to the formation of toner fines when employed in a copying machine. Such fines contaminate the copier and shorten the developer life.

The particle size and concentration of the colloidal stabilizers determines the size of the final toner particles. The smaller the size and/or the higher the concentration of the colloidal such particles, the smaller the size of the final toner particles. The particulate stabilizer is generally used in an amount ranging from about 1–25 parts, by weight per 100 parts, of the final polymeric powder.

In the embodiments of the novel method wherein the stabilizers are colloidal silica, the aqueous phase also contains a promoter that is water soluble and affects the hydrophilic/hydrophobic balance of the silica stabilizer in the aqueous solution. The promoter drives the solid dispersing agent, that is, the particulate stabilizer to the polymer/solvent droplet-water interface. Typical of such promoters are sulfonated polystyrenes, alginates, carboxy methyl cellulose, tetramethyl ammonium hydroxide or chloride, diethylaminoethylmethacrylate, water soluble complex resinous amine condensation products such as the water soluble condensation products of dialkinol amine and adipic acid, especially, poly (adipic acid-co-metlhylaminoethanol), water soluble condensation products of ethylene oxide, urea and formaldehyde and polyethyleneimine. Also effective for this purpose are gelatin, casein, albumin, gluten and the like or nonionic materials such as methoxycellulose. The promoter is generally used in an amount from about 0.2 to about 0.6 parts per 100 parts of aqueous solution. A promoter is not required when latex stabilizers are employed.

After the organic solution is added to the aqueous solution the resultant mixture is homogenized at high shear rate. In this process, the particulate stabilizer forms an interface between the aqueous phase and the organic globules in the organic phase. Because of the high surface area of the small polymer particles, the coverage by the particulate stabilizer is not complete. Coalescence continues until the surface of the polymer particles are completely covered by a thin skin of the particulate stabilizer. Thereafter, no further growth of the particles occurs. Accordingly, the amount of the particulate stabilizer is inversely proportional to the size of the toner obtained. The relationship between the aqueous phase and the organic phase, by volume, may range from 1.5:1 to approximately 9:1. This indicates that the organic phase is typically present in an amount from about 10% to 40% of the total homogenized volume.

The size of the droplets formed, depends on the shearing action on the system plus the amount of the particulate stabilizer employed. While any high shear type agitation device can be used in the process of this invention, it is preferred that the polymer in solution be introduced into the aqueous phase in a microfluidizer such as Model No. 110T produced by Microfluidics Manufacturing. In this device the droplets of polymer in solvent are dispersed and reduced in size in the water phase in a high shear agitation zone and upon exiting this zone the polymer-in-solution droplets from a discontinuous phase in the continuous aqueous phase. The polymer-in-solution droplets are each surrounded by the solid colloidal stabilizer particles which limits and controls both the size and size distribution of the solvent-polymer droplets.

After exiting the microfluidizer, the solvent is removed from the polymer droplets, preferably, by heating the entire system to vaporize the solvent and remove it from the discontinuous phase droplets remaining in the aqueous solution and surrounded by the stabilizer particles.

Next, should it be desired, the stabilizer can be removed from the surfaces of the polymer particles by any suitable technique. A silica stabilizer can be removed by dissolving in HF or by adding an alkaline agent such as potassium or sodium hydroxide to the aqueous phase containing the polymer particles to raise the pH to at least about 12 while stirring. After raising the pH and dissolving the silica, the polymer particles can be recovered by filtration and washed with water or other agents to remove any undesired impurities from their surfaces. Latex stabilizer particles need not be removed. They can remain as a skin on the surface of the binder polymer particles and will not impair the use of such particles as electrostatographic toners.

The colloidal stabilizer particles generally should have dimensions from about 1 nm to about 200 nm and, preferably, from about 5 to 65 nm. The size and concentration of these colloidal particles determines the size of the final toner particle.

In the method of the invention, the quantities of the various materials employed and their relationship to each other can vary over wide ranges. It has been found, however, that the ratio of the polymer to the solvent should vary from about 1 to about 80 percent by weight of combined weight of the polymer and the solvent and that the combined weight of the polymer in the solvent should vary with respect to the quantity of water employed from about 25 to about 50 percent in weight.

As a result of the way they are made, i.e., by the process of the invention, the toner particles of the invention are non-spherical. The toner compositions of the invention differ markedly from compositions made by melt compounding and pulverization. The latter technique forms powders of wide particle size distribution while the powders of the present invention are monodisperse, i.e., of narrow particle size distribution.

The term "particle size" used herein, and the term "size" or "sized" in reference to "particles", means the median volume weighted diameter as measured by conventional diameter measuring devices, such as a Coulter Multisizer, sold by Coulter, Inc. of Hialeah, Fla. Median volume weighted diameter is the diameter of an equivalent weight spherical particle which represents the median for a sample. Toner particles having an average size of from 0.1 $\mu$m to 60 $\mu$m are prepared in accordance with this invention. The preferred toner particles of the invention have a particle size in the range from 2 to 20 $\mu$m.

The toner compositions of the invention have significant advantages over other toner compositions. They provide images with excellent image characteristics because of their narrow particle size distribution and the nonspherical shape of the toner particles. The toner particles of the invention of narrow particle size distribution are described herein as "monodisperse". A monodisperse particle size distribution can be recognized by visual microscopic inspection but monodispersity can also be quantified by specifying the "fineness index" and the "coarseness index".

The fineness index can be defined by the ratio $d_{50}/d_{16}$. The "$d_{50}$" is determined from the cumulative number particle size distribution curve and corresponds to the size at which the cumulative number of particles reaches 50%. Similarly, the coarseness index is defined as the $D_{84}/D_{50}$. In this case, the "$D_{50}$" is similar to "$d_{50}$" but refers to the size obtained from the cumulative volume particle size distribution curve and corresponds to the size at which the cumulative volume of particles reaches 50%. The fineness index of the particles of the invention is between about 1.0 and 1.35 and the coarseness index is also between about 1.0 and 1.35. For comparison purposes, a typical number for a toner composition made by pulverization is about 1.5 to 2.5.

The irregular particles of the invention are preferred over spherical particles for reasons related to dot integrity, toner transfer efficiency from photoconductor and developer efficiency. However, as particles get rougher and more irregular, they also promote the formation of toner flakes in the developer station and during toner replenishment to the developer station. These flakes readily develop in the image area and are easily noticed. Further, they are found to be highly unacceptable. Hence, the toner particles of the invention have a limited range of toner irregularity which will provide image quality benefits without the propensity to form flakes.

It is easy to distinguish between spherical and irregular particles, but to differentiate among irregular particles is more difficult. A preferred method for defining the degree of surface irregularity is by calculating the ratio of the surface area as measured by BET and Coulter counter. The BET (Brunauer, Emmett and Teller) technique involves the absorption of a specific gas molecule on the surface of the toner. By knowing the surface area of the gas molecule and the amount of gas molecules used to form a monolayer coverage, it is possible to calculate the true surface area of the toner. The principles of surface area measurement by BET method are described in "Physical Chemistry of Surfaces", pages 584–588 and 602–605 by A. W. Adamson, Second Edition, Intersciences.

On the other hand, the Coulter Counter used for determining the toner particle size, estimates the particle size by calculating the equivalent diameter of a sphere which has the same displaced volume as the toner particle. Therefore, the ratio of surface areas of spherical particles as determined by BET and Coulter equals 1.0. This ratio is independent of the toner particle size. For irregular toner particles, the ratio is greater than unity and at the same time the toner particles show improved performance. When the ratio exceeds, 3.0, however, it has been found that the toner particles produce unacceptable levels of toner flakes in the copying machine. Therefore, the novel toner compositions of the invention have a BET to Coulter surface area ratio between 1.5 to 3.0, and preferably between 2.0 and 2.6.

The polymeric powder compositions of the invention comprise particles of irregular shape, as defined by the BET to Coulter surface area ratio and they exhibit superior transfer properties when employed as electrostatographic toner compositions. This is evidenced, e.g., by a low toner residue on the photoconductor, that is, by little or no toner remaining on the photoconductor surface after the toner image is electrostatically transferred to a receiver sheet. In the preferred compositions of the invention, polymeric particles are not only of irregular shape, but unlike the particles described in U.S. Pat. No. 5,283,151, their surfaces are substantially free of carnauba wax or other materials that would adversely affect powder flow.

Powders suitable as carrier particles for toners can also be prepared in accordance with this invention. In the preparation of carrier particles it may be desirable to include in the polymer that is ultimately to be dissolved or in the step of dissolution of the polymer in the solvent that is immiscible with water, magnetic materials such as those disclosed in U.S. Pat. No. 4,546,060 or U.S. Pat. No. 4,345,014. Toner compositions having such magnetic materials blended with the toner binder polymer are also within the scope of the invention. They can be used as single-component developers without a carrier in magnetic brush development.

Various additives generally present in electrostatographic toners, such as pigments and charge control agents, can be added to the polymer prior to dissolution in the solvent or in the dissolution step itself. Suitable charge control agents are disclosed, for example, in U.S. Pat. Nos. 3,893,935; 4,079,014; 4,323,634 and British Patent Nos. 1,501,083 and 1,420,839. Charge control agents are generally employed in small quantities such as from about 0 to about 10 parts per hundred based upon the weight of the final toner product, and preferably from about 0.2 to about 3.0 parts per hundred based on the weight of the toner.

Pigments suitable for toner particles of the present invention should be dispersible in the core polymer, insoluble in water and should yield strong permanent color to the particles. Typical of such pigments are organic pigments such as phthalocyanines, lithols and the like and inorganic pigments such as $TiO_2$, carbon black and the like. Typical of the phthalocyanine pigments are copper phthalocyanine, monochlor copper phthalocyanine, and hexadecachlor copper phthalocyanine. Other useful organic pigments include anthraquinone vat pigments such as vat yellow 6GLCL1127, quinone yellow 18–1, indanthrone CL1106, pyranthrone CL1096, brominated pyranthrones such as dibromopyranthrone, vat brilliant orange RK, anthramide brown CL1151, dibenzanthrone green CL1101, flavanthrone yellow CL1118; azo pigments such as toluidine red CL69 and hansa yellow; and metallized pigments such as azo yellow and permanent red. The carbon black may be any of the known types such as channel black, furnace black, acetylene black, thermal black, lamp black and aniline black. The pigments are employed in an amount sufficient to give a content thereof in the toner from about 1 to 40%, by weight, based upon the weight of the toner, and preferably within the range of 4 to 20%, by weight.

The toner can also contain other additives, including magnetic pigments, leveling agents, surfactants, stabilizers, and the like. The concentrations can vary, but, preferably, the concentration is not more than about 10 weight percent of such additives on a total toner powder composition weight basis.

Toners of the invention are particularly useful in two-component developers of the invention that comprise a mixture of the described toner particles and of carrier particles that are capable of triboelectrically charging the toner particles. Carriers can be conductive, non-conductive, magnetic, or non-magnetic. Carriers are particulate and can be glass beads; crystals of inorganic salts such as aluminum potassium chloride, ammonium chloride, or sodium nitrate; granules of zirconia. silicon, or silica; particles of hard resin such as poly(methyl methacrylate); and particles of elemental metal or alloy or oxide such as iron, steel, nickel, carborundum, cobalt, oxidized iron and mixtures of such materials. Examples of carriers are disclosed in U.S. Pat. Nos. 3,850,663 and 3,970,571. Especially useful in magnetic brush development procedures are iron particles such as porous iron, particles having oxidized surfaces, steel particles, and other "hard" and "soft" ferromagnetic materials such as gamma ferric oxides or ferrites of barium, strontium, lead, magnesium, or aluminum. Such carriers are disclosed in U.S. Pat. Nos. 4,042,518; 4,478,925; 4,764,445, 5,306,592 and 4,546,060.

Carrier particles can be uncoated or can have a polymeric surface coating of a thin layer of a film-forming resin to establish the correct triboelectric relationship and charge level with the toner employed. Examples of suitable resins are the polymers described in U.S. Pat. Nos. 3,547,822, 3,632,512, 3795,618 and 3,898,170 and Belgian Patent No. 797,132. Other useful resins are fluorocarbons such as polytetrafluoroethylene, poly(vinylidene fluoride), mixtures of these, and copolymers of vinylidene fluoride and tetrafluoroethylene. See for example, U.S. Pat. Nos. 4,545,060, 4,478,925, 4,076,857, 3,970,571 and 4,726,994. Polymeric fluorocarbon coatings can aid the developer to meet the electrostatic force requirements mentioned above by shifting the carrier particles to a position in the triboelectric series different from that of the uncoated carrier core material to adjust the degree of triboelectric charging of both the carrier and toner particles. The polymeric fluorocarbon coatings can also reduce the frictional characteristics of the carrier particles in order to improve developer flow properties; reduce the surface hardness of the carrier particles to reduce carrier particle breakage and abrasion on the photoconductor and other components; reduce the tendency of toner particles or other materials to undesirably permanently adhere to carrier particles, and alter electrical of the carrier particles.

The carrier can be strontium ferrite coated with 0.5 weight percent fluorocarbon polymer and treated with an aqueous solution of 4 weight percent KOH and 4 weight percent of a 2 parts by weight to 1 parts by weight mixture of $Na_2S_2O_8$ and $Na_2S_2O_5$ as disclosed in U.S. patent application Ser. No. 08/127,382, filed Sep. 24, 1993, by William E. Yoerger. which is incorporated herein by reference. The fluorocarbon is also referred to as "modified Kynar®". In a preferred embodiment, the carrier is sponge iron, which is sieved. oxidized and coated with fluorocarbon on a 0.2 weight percent basis.

In a particular embodiment, the developer contains from about 1 to about 20 percent by weight of toner and from about 80 to about 99 percent by weight of carrier particles. Usually, carrier particles are larger than toner particles. Conventional carrier particles have a particle size of from about 5 to about 1200 micrometers and are generally from 20 to 200 micrometers.

The developer can be made by simply mixing the described toner composition and the carrier in a mixing device. The components are mixed until the developer achieves a maximum charge. Useful mixing devices include roll mills and other high energy mixing devices.

The invention will be further illustrated by the working examples below. First are Comparative Examples 1–9 limited coalescence procedures that employ colloidal silica in a known manner and that form spherical toner particles. Following these comparative examples are examples of the invention which demonstrate the preparation of non-spherical polymer particles by limited coalescence employing colloidal silica stabilizers having opposite electrostatic charges.

Comparative Example 1

An organic solution was prepared by mixing about 25 grams of a low molecular weight polyester available commercially as Almacryl T-500 from Image Polymers Company with about 100 g of ethyl acetate. In a separate container, an aqueous phase was prepared by mixing about 375 ml of distilled water, 9.2 ml of a sodium stabilized silica suspension which has a negative surface charge, the particles of which have a size of about 60 nm (Nalcoag™ 1060 (50% solids) sold by the Nalco Chemical Company) and about 2.7 ml of a 10 percent solution of poly(adipic acid-co-methylaminoethanol). The pH of the above aqueous mixture was adjusted to approximately 4 by the addition of 1.0N hydrochloric acid. The temperature of the aqueous mixture was about 29° C. The organic polyester/solvent solution and aqueous were then added together and immediately subjected to shear using a Silverson mixer followed by a Microfluidizer unit sold by Microfluidics operating at 275 kPa. Upon exiting, the solvent was evaporated from the resulting organic particles in the aqueous phase by stirring overnight at 40° C. in an open container. The resulting silica-covered particles were spherical and of particle size ranging from 3 to 7 $\mu$m. These spherical beads were washed with water and then stirred in a 1.0N sodium hydroxide solution to remove the silica particles from their surfaces. The following day the silica-free polymer particles were recovered from the sodium hydroxide solution by filtration, washed with water and dried. The particles have had a size distribution ranging from 3 to 6 $\mu$pm and were spherical.

Comparative Example 2

The procedure of Comparative Example 1 was repeated except that the organic phase was prepared by using a polyester binder having low acid value bisphenol A based Binder P polymer sold commercially by Kao Corporation. The resulting polymer particles have a size distribution ranging from 3 to 7 $\mu$m and had a spherical morphology. By changing the acid value of the polyester, no effect on the shape of the particle was observed.

Comparative Example 3

The procedure of Comparative Example 1 was repeated except that the organic solution was prepared by mixing about 25 grams of the low molecular weight polyester and 0.125 g of the charge control agent Bontron E-88 sold commercially by Orient Chemicals Company with about 100 g of ethyl acetate. The resulting toner particles had a size distribution ranging from 3 to 7 $\mu$m and also had a spherical morphology. By including charge control agent into the formulation, no effect on the shape of the particle was observed.

Comparative Example 4

The procedure of Comparative Example 1 was repeated except that the aqueous phase was prepared by mixing about 375 ml of distilled water, 12.5 ml of a sodium stabilized silica suspension which has a negative surface charge, the particles of which have a size of about 75 nm, this material being sold under the trademark Nalcoag 2329 (50% solids) by the Nalco Chemical Company and about 3.75 ml of a 10 percent solution of poly(adipic acid-co-methylaminoethanol). The pH of the above aqueous mixture was adjusted to approximately 4 by the addition of 1.0N HCl. The organic polyester/solvent solution and aqueous were then added together and immediately subjected to shear using a Silverson mixer followed by a Microfluidizer unit operating at 275 kPa. Upon exiting, the solvent was removed from the resulting organic particles in the aqueous phase by stirring overnight at 40° C. in an open container. Resulting particles were washed with water and then stirred in a 1.0N NaOH solution to remove the silica particles from the surface. The silica free polyester polymer particles were recovered from the sodium hydroxide solution by filtration, washed with water and dried. The particles had a size distribution ranging from 2 to 5 µm and a spherical morphology. The results indicate that increasing the size of the particulate stabilizer does not affect the shape and morphology of the resulting particles.

Comparative Example 5

The procedure of Comparative Example 1 was repeated except that the aqueous phase was prepared by mixing about 375 ml of distilled water, 6.0 ml of a sodium-stabilized silica suspension which has a negative surface charge, the particles of which have a size of about 22 nm, this material being sold under the trademark Ludox® TM (50% solids) by the Dupont Chemical Company and about 1.8 ml of a 10 percent solution of poly(adipic acid-co-methylaminoethanol). The resulting particles had a size distribution ranging from 3 to 7 µm and exhibited a spherical morphology. The results indicate that lowering the size of the particulate stabilizer does not affect the shape and morphology of the resulting particles.

Comparative Example 6

The procedure of Comparative Example 1 was repeated except that the aqueous phase was prepared by mixing about 375 ml of distilled water, 2.5 ml of a alumina-coated silica suspension which has a positive surface charge, the particles of which had a size of about 12 nm, this material being sold under the trademark Ludox® CL (30% solids) by the Dupont Chemical Company and about 0.75 ml of a 10 percent solution of poly(adipic acid-co-methylaminoethanol). The pH of the above aqueous mixture was adjusted to approximately 7 by the addition of 0.5N NaOH. The resulting isolated particles had a size distribution ranging from 5 to 10 µm and exhibited a spherical morphology. The results indicate that changing the polarity of the particulate stabilizer does not affect the shape and morphology of the resulting particles.

Comparative Example 7

The procedure of Comparative Example 3 was repeated except that the organic solution was prepared by mixing about 23.25 grams of the low molecular weight polyester, 0.25 g of the charge control agent, and 1.75 g of milled copper phthalocyanine pigment (Color Index P.B. 15:3) with about 100 g of ethyl acetate. The resulting toner particles had a size distribution ranging from 3 to 7 µm and a spherical morphology. By including pigment and charge control agent in the formulation, no effect on the shape of the particle was observed with a negative charging stabilizer.

Comparative Example 8

The procedure of Comparative Example 6 was repeated except that the organic solution was prepared by mixing about 23.25 grams of the low molecular weight polyester, 0.25 g of the charge control agent Bontron E-88 and 1.75 g of milled Fanal Pink 4830 pigment available from BASF (Color Index P.R. 81:1) with about 100 g of ethyl acetate. The resulting toner particles had a size distribution ranging from 5 to 10 µm and also exhibit a spherical morphology. By including pigment and charge control agent in the formulation. no effect on the shape of the particle was observed with a positive charging stabilizer.

Comparative Example 9

The procedure of Comparative Example 6 was repeated except that the aqueous phase was prepared by mixing about 375 ml of distilled water, 2.0 ml of Ludox® TM negatively-charged sodium-stabilized silica suspension available and 0.68 ml of alumina-coated Ludox® CL silica suspension which has a positive surface charge, the particles of which have a size of about 12 nm. The pH of the above aqueous mixture was adjusted to 4 by the addition of one normal hydrochloric acid. The resulting isolated particles had a size distribution ranging from 5 to 10 µm and exhibited a spherical morphology. Hence it was not possible to obtain irregular shaped particles at the low pH where positive charging particulate stabilizers do not coagulate and are primarily present in the aqueous phase.

The following examples demonstrate the preparation of non-spherical polymer particles by the method of the invention.

EXAMPLE 1

The procedure of Comparative Example 6 was repeated except that the aqueous phase was prepared by mixing about 375 ml of distilled water, 2.0 ml of Ludox® negatively-charged, sodium-stabilized silica suspension and 0.68 ml of Ludox® CL alumina-coated silica suspension which has a positive surface charge and the particles of which have a size of about 12 nm. The pH of the aqueous mixture was adjusted to between 5 and 7 by the addition of 1.0N sodium hydroxide. The resulting isolated polymer particles had a size distribution ranging from 5 to 10 µm and exhibited an irregular morphology. The results show that by adjusting the pH of the aqueous phase so that both opposite charging particulate stabilizers precipitate and form the skin of the polymer particles prior to evaporation of the solvent, it is possible to alter the surface topography of the resulting particles.

EXAMPLE 2

The procedure of Comparative Example 6 was repeated except that the aqueous phase was prepared by mixing about 375 ml of distilled water, 2 ml of Ludox® negatively-charged sodium-stabilized silica suspension and 0.68 ml of Ludox® CL alumina-coated silica suspension which has a positive surface charge, the particles of which have a size of about 12 nm, and about 1.05 ml of a 10 percent solution of poly(adipic acid-co-methylaminoethanol). The pH of the above aqueous mixture was adjusted to approximately 4 by the addition of one normal hydrochloric acid. The temperature of the aqueous mixture was about 22.6° C. The organic polyester/solvent solution and aqueous were then added together and immediately subjected to shear using a Silverson mixer followed by a Microfluidizer unit operating at 275 kPa. Upon exiting, the pH of the mixture was found to be 4.0. When particles were isolated, they were of spherical shape. In order to obtain irregular shape, the pH of the mixture was adjusted to above 5 with the addition of 1.0N sodium hydroxide. The mixture was subjected to shear one again using a Microfluidizer unit operating at 275 kPa. It was found that by increasing the pH and causing both the positive and negative charging silica particles to aggregate on the organic particle surface, irregular particles were obtained. The size of the resulting particles ranged from 5 to 10 µm.

EXAMPLE 3

The procedure of Example 1 was repeated except that the aqueous phase was prepared by mixing about 375 ml of distilled water, 3.25 ml of Ludox® negatively-charged, sodium-stabilized silica suspension and 1.75 ml of Ludox® CL alumina-coated silica suspension which has a positive surface charge, and about 1.05 ml of a 10 percent solution of poly(adipic acid-co-methylaminoethanol). After isolation, irregularly shaped particles were obtained. The size of these particles ranged from 5 to 10 µm.

EXAMPLE 4

The procedure of Example 3 was repeated except that the organic solution was prepared by mixing about 23.25 g of Almacryl T-500 low molecular weight polyester, 0.25 g of the charge control agent Bontron E-88, and 1.75 g of milled Fanal Pink 4830 pigment, with about 100 g of ethyl acetate. The resulting toner particles had a size distribution ranging from 5 to 10 µm and also exhibited irregular particle morphology. By including pigment and charge control agent into the formulation, no adverse effect was observed in the ability to obtain irregular shaped particles by the mixing of oppositely charged particulate stabilizers.

EXAMPLE 5

The procedure of Example 3 was repeated except that the organic solution was prepared by mixing about 23.25 g of a low molecular weight polyester a low mw polyester sold as Binder P by Kao Corporation, 0.25 g of the charge control agent Bontron E-88, and 1.75 g of milled Fanal Pink 4830 pigment with about 100 g of ethyl acetate. The resulting toner particles have a size distribution ranging from 5 to 10 µm and also exhibit irregular particle morphology. By including pigment and charge control agent into the formulation, no adverse effect was observed in the ability to obtain irregular shaped particles by the approach of mixing opposite charge particulate stabilizers.

EXAMPLE 6

The procedure of Example 3 was repeated except that the organic solution was prepared by mixing about 23.25 g of the low molecular weight polyester, 0.25 g of the charge control agent Bontron E-88, and 1.75 g of milled copper phthalocyanine pigment (Color Index P.B. 15:3) with about 100 g of ethyl acetate. The resulting toner particles had a size distribution ranging from 3 to 7 µm and also exhibited irregular particle morphology.

The preparation of both anionic and cationic latex particles is described hereinafter. Following those descriptions are Comparative Examples 10 and 11 which describe the use of either an anionic or a cationic latex as the stabilizer for evaporative limited coalescence formation of toner particles. Following the two comparative examples is Example 7 of the invention which describes the use of a mixture of anionic and cationic latex stabilizers to obtain by evaporative limited coalescence a toner powder composed of particles of non-spherical irregular morphology.

Preparation of Anionic Latex Particles

An aqueous solution was prepared by mixing 4.5 g of sodium dodecyl sulfate in 2000 ml of deionized water. The solution was heated to 90° C. and to this heated solution was added a mixture of monomers which included 15 g of styrene 15 g of isobutyl methacrylate, 21 g of hydroxyethyl methacrylate, 3 g of methacrylic acid and 3 g of ethylene glycol dimethacrylate. The mixture was continuously at 350 rpm. After 2 minutes, 0.26 g of ammonium persulfate was added as the polymerization initiator. The polymerization reaction was carried out at 90° C. for two and a half hours. The resulting latex was filtered and the pH adjusted to 7.0 using 1N potassium hydroxide solution. The final washing of the latex particles were carried out using diafiltration until the surface tension value of 6 dyne/cm was achieved.

Preparation of Cationic Latex Particles

An aqueous solution was prepared by mixing 0.8 g of cationic lauryl trimethoxy ammonium chloride and 16 g of nonionic Olin 106 surfactant in 1000 ml of deionized water. The solution was heated to 80° C. and to this heated solution was added a mixture of monomers which included 13.5 g of styrene, 9 g of hydroxy ethyl methacrylate, 4.5 g of 4-vinylpyridene and 3 g of ethylene glycol dimethacrylate. The mixture was continuously stirred at 350 rpm. After 2 minutes, 0.2 g of 2,2-azobis(2-amidoamino propane dihydrochloride) was added as the initiator. The polymerization reaction was carried out at 80° C. for two and a half-hours. The resulting latex was filtered and the pH adjusted to 7.0 using a 1N potassium hydroxide. The final washing of the latex particles were carried out using diafiltration until the surface tension value of 6 dyne/cm was achieved.

Comparative Example 10

Limited coalescence toners were prepared from a polymer solution and with an anionic latex stabilizer s described above, substantially by the procedure described in Example 4 of U.S. Pat. No. 5,133,992. The resulting toner particles had an average particle size of 6 µm and were spherical in shape.

Comparative Example 11

Limited coalescence toners were prepared from a polymer solution and with a cationic latex stabilizer as described above, substantially by the procedure described in Example 4 of U.S. Pat. No. 5,133,992. The resulting toner particles had an average particle size of 6 µm and were spherical.

EXAMPLE 7

Limited coalescence toners were prepared from a polymer solution substantially by the procedure described in Example 4 of U.S. Pat. No. 5,133,992 and employing a 50/50 by weight mixture of the above-described anionic and cationic stabilizers. After the isolation step, the resulting toner particles had an average particle size of 6 µm and were irregular in shape.

The invention has been described with particular reference to preferred embodiments thereof but it will be understood that variations and modification can be effected within the spirit and scope of the invention. All the patents and other references cited above are fully incorporated by reference herein.

What is claimed is:

1. The method for preparing polymeric powders of irregular particle shape which comprises forming an organic phase comprising an organic polymer dissolved in a water-immiscible organic solvent, forming an aqueous phase comprising water, solid colloidal stabilizer particles having a positive electrostatic charge and solid colloidal stabilizer particles having a negative electrostatic charge, mixing said aqueous phase and said organic phase and homogenizing the resulting mixture by high shear agitation, thereby forming a suspension of small particles of said polymer in the water, said particles having a thin coating of said positively charged and negatively charged stabilizer particles on their surfaces, and separating the water-immiscible solvent from the polymer to obtain a powder of stabilizer-coated polymer particles, of non-spherical, irregular shape.

2. The method according to claim 1 wherein the solvent is removed from the polymer by evaporation.

3. The method according to claim 2 for making an electrostatographic toner wherein toner additives, including pigment and charge control agent, are mixed with the organic phase before mixing with the aqueous phase.

4. The method according to claim 1 where said colloidal stabilizer particles are colloidal silica particles.

5. The method according to claim 1 wherein said colloidal stabilizer particles are latex particles.

6. The method according to claim 4 wherein silica is removed by washing the polymer particles with an alkaline solution.

7. The method according to claim 6 wherein the polymer particles are dried after washing with the alkaline solution to obtain a monodisperse toner powder of non-spherical polymer particles having particle size in the range from 2 to 20 $\mu$m.

8. The method according to claim 1 which further comprises adjusting the solution conditions to cause both the positively-charged and the negatively-charged stabilizer particles to deposit on the polymer particles.

9. The method according to claim 4 wherein the aqueous phase contains a water-soluble promoter.

* * * * *